United States Patent
Yokoyama

(10) Patent No.: US 10,418,903 B2
(45) Date of Patent: Sep. 17, 2019

(54) SWITCHING CIRCUIT

(71) Applicant: TOYOTA JIDOSHA KABUSHIKI KAISHA, Toyota-shi (JP)

(72) Inventor: Atsuko Yokoyama, Nagoya (JP)

(73) Assignee: TOYOTA JIDOSHA KABUSHIKI KAISHA, Toyota-shi (JP)

(*) Notice: Subject to any disclaimer, the term of this patent is extended or adjusted under 35 U.S.C. 154(b) by 0 days.

(21) Appl. No.: 16/264,753

(22) Filed: Feb. 1, 2019

(65) Prior Publication Data
US 2019/0252977 A1  Aug. 15, 2019

(30) Foreign Application Priority Data

Feb. 9, 2018  (JP) ................................. 2018-021957

(51) Int. Cl.
| | | |
|---|---|---|
| *H02M 7/537* | (2006.01) | |
| *H02M 3/158* | (2006.01) | |
| *H02M 1/088* | (2006.01) | |
| *H02M 1/14* | (2006.01) | |
| *H02P 27/06* | (2006.01) | |

(52) U.S. Cl.
CPC .......... *H02M 3/158* (2013.01); *H02M 1/088* (2013.01); *H02M 1/143* (2013.01); *H02M 7/537* (2013.01); *H02P 27/06* (2013.01)

(58) Field of Classification Search
CPC ........ H02M 3/158; H02M 1/08; H02M 1/096; H02M 1/143; H02M 7/53; H02M 7/42; H02M 7/44; H02M 7/48; H02M 7/537; H02M 27/06; H02M 27/08
See application file for complete search history.

(56) References Cited

U.S. PATENT DOCUMENTS

| | | | | |
|---|---|---|---|---|
| 5,963,442 A | * | 10/1999 | Yoshida | .................... B60L 1/00 |
| | | | | 363/98 |
| 2014/0091324 A1 | * | 4/2014 | Zushi | ...................... H02M 1/08 |
| | | | | 257/77 |
| 2018/0056795 A1 | * | 3/2018 | Xu | ........................ H03K 17/567 |
| 2018/0269773 A1 | * | 9/2018 | Kaeriyama | ............ H02M 1/08 |
| 2018/0269791 A1 | * | 9/2018 | Shamsi | ............ H02M 3/33507 |
| 2019/0137547 A1 | * | 5/2019 | Muraho | ............... G01R 19/165 |

FOREIGN PATENT DOCUMENTS

JP  2016-073052  5/2016

* cited by examiner

*Primary Examiner* — Adolf D Berhane
(74) *Attorney, Agent, or Firm* — Oblon, McClelland, Maier & Neustadt, L.L.P.

(57) ABSTRACT

A switching circuit includes: a DC electric power supply; a first switching element; a second switching element; a resistor that is connected to the DC electric power supply in series with the second switching element; a voltage sensor that detects a voltage applied to the resistor; and a control device, wherein: a current flowing through the first switching element is larger than a current flowing through the second switching element; and the control device is configured to: turn off the second switching element and then turn off the first switching element; and compute a voltage applied between the first collector and the first emitter by integrating a value proportional to a voltage that is detected by the voltage sensor after turning off the first switching element.

4 Claims, 4 Drawing Sheets

SWITCHING CIRCUIT

INCORPORATION BY REFERENCE

The disclosure of Japanese Patent Application No. 2018-021957 filed on Feb. 9, 2018 including the specification, drawings and abstract is incorporated herein by reference in its entirety.

BACKGROUND

1. Technical Field

The art disclosed in the present specification relates to a switching circuit.

2. Description of Related Art

A switching circuit is disclosed in Japanese Patent Application Publication No. 2016-073052 (JP 2016-073052 A). The switching circuit of Japanese Patent Application Publication No. 2016-073052 (JP 2016-073052 A) is equipped with a DC electric power supply, a switching element that is connected to the DC electric power supply, and a control device. The switching element is equipped with a gate, a collector that is connected to a positive electrode side of the DC electric power supply, and an emitter that is connected to a negative electrode side of the DC electric power supply. Besides, the switching circuit of Japanese Patent Application Publication No. 2016-073052 (JP 2016-073052 A) is equipped with a differentiation circuit, which is constituted of a capacitor and a resistor, and a comparator.

SUMMARY

In the switching circuit of Japanese Patent Application Publication No. 2016-073052 (JP 2016-073052 A), when the switching element changes over from its on state to its off state, a surge voltage is applied between the collector and the emitter of the switching element, as a result of a parasitic inductance in the switching circuit. In the switching circuit of Japanese Patent Application Publication No. 2016-073052 (JP 2016-073052 A), a change in the surge voltage applied between the collector and the emitter of the switching element is detected by comparing a differential value obtained by the differentiation circuit with a voltage differentiation reference value through the use of the comparator. However, in the switching circuit of Japanese Patent Application Publication No. 2016-073052 (JP 2016-073052 A), an additional capacitor that constitutes the differentiation circuit is needed to detect the surge voltage. The additional capacitor is required to withstand high voltage in order to detect the surge voltage, and hence is expensive enough to cause an increase in cost. Thus, the present disclosure provides a switching circuit that makes it possible to measure a voltage applied between a collector and an emitter of a switching element through the use of an existing configuration.

An aspect of the present disclosure relates to a switching circuit including: a DC electric power supply; a first switching element that is connected to the DC electric power supply, the first switching element including a first gate, a first collector that is connected to a positive electrode side of the DC electric power supply, and a first emitter that is connected to a negative electrode side of the DC electric power supply; a second switching element that is connected to the DC electric power supply in parallel with the first switching element, the second switching element including a second gate, a second collector that is connected to the positive electrode side of the DC electric power supply, and a second emitter that is connected to the negative electrode side of the DC electric power supply; a resistor that is connected to the DC electric power supply in series with the second switching element; a voltage sensor that detects a voltage applied to the resistor; and a control device, wherein: a current flowing through the first switching element is larger than a current flowing through the second switching element; and the control device is configured to: from a state where a potential of the first gate of the first switching element and a potential of the second gate of the second switching element are the same and are equal to an on-potential, turn off the second switching element by setting the potential of the second gate of the second switching element equal to an off-potential and then turn off the first switching element by setting the potential of the first gate equal to an off-potential; and after turning off the first switching element, compute a voltage applied between the first collector and the first emitter by integrating a value proportional to a voltage that is detected by the voltage sensor after turning off the first switching element.

The switching circuit may be equipped with a subsidiary switching element (the second switching element) and the resistor so as to measure a current flowing through a main switching element (the first switching element). According to the above-mentioned configuration, the voltage applied between a collector (the first collector) and an emitter (the first emitter) of the main switching element (the first switching element) can be measured through the use of the subsidiary switching element (the second switching element) and the resistor. That is, according to the above-mentioned configuration, when the control device turns off the second switching element, a parasitic capacitor is formed by the second switching element. An electric charge accumulated in this parasitic capacitor assumes a value proportional to the voltage applied between the first collector and the first emitter of the first switching element. As a result, a current flowing from this parasitic capacitor assumes a value proportional to a time derivative of the voltage applied between the first collector and the first emitter of the first switching element. Therefore, a current flowing through the resistor, which is connected in series to the second switching element, after the control device turns off the second switching element assumes a value proportional to the time derivative of the voltage applied between the first collector and the first emitter of the first switching element. Thus, the control device can compute the voltage applied between the first collector and the first emitter of the first switching element, by integrating the value proportional to the voltage applied to the resistor (the voltage detected by the voltage sensor), after turning off the first switching element. According to this configuration, the voltage applied between the first collector and the first emitter of the first switching element can be measured through the use of the existing second switching element and the existing resistor, even though there is no additional component (e.g., a capacitor).

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
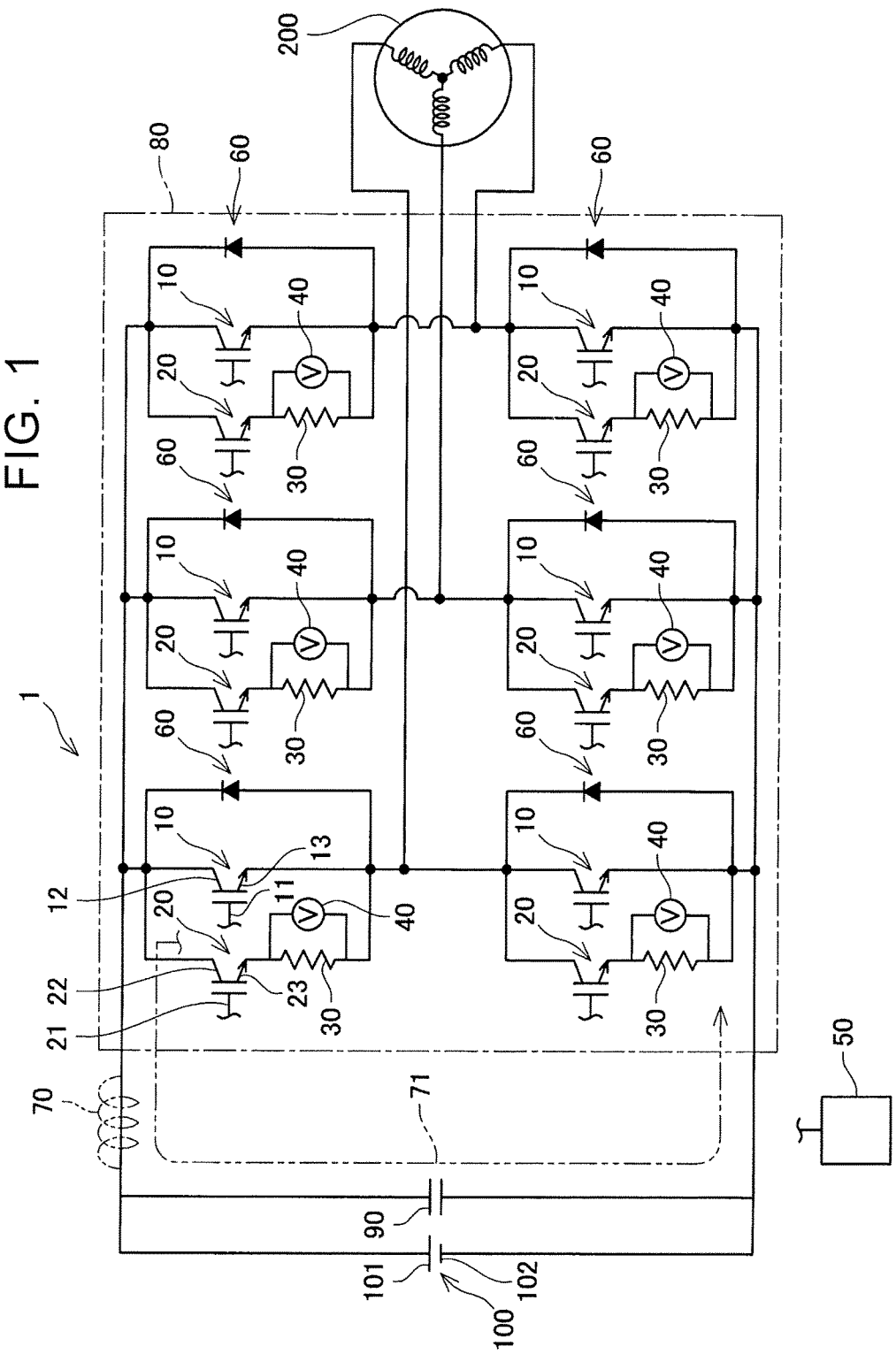
FIG. 1 is a view schematically showing a switching circuit according to one of the embodiments.

A switching circuit 1 according to one of the embodiments will be described with reference to the drawings. As shown in FIG. 1, the switching circuit 1 according to the embodiment is equipped with a DC electric power supply 100, a smoothing capacitor 90, an inverter 80, and a control device 50. This switching circuit 1 is connected to a motor 200. The motor 200 is, for example, a motor for driving a hybrid vehicle or an electric vehicle.

The DC electric power supply 100 in the switching circuit 1 is equipped with a positive electrode 101 and a negative electrode 102. The DC electric power supply 100 is, for example, a secondary battery such as a nickel hydride battery, a lithium-ion battery or the like. The voltage of the DC electric power supply 100 is, for example, 200 to 400 V. The DC electric power supply 100 is connected to the inverter 80 via the smoothing capacitor 90. The DC electric power supply 100 is connected to the motor 200 via the inverter 80. The DC electric power supply 100 supplies electric power to the motor 200 via the inverter 80. The smoothing capacitor 90 is arranged between the DC electric power supply 100 and the inverter 80. The smoothing capacitor 90 smooths the voltage of the DC electric power supply 100.

The inverter 80 is arranged between the DC electric power supply 100 and the motor 200. The inverter 80 converts a DC electric power of the DC electric power supply 100 into an AC electric power, and supplies the AC electric power to the motor 200. The inverter 80 is equipped with a plurality of first switching elements 10 and a plurality of diodes 60. Besides, the inverter 80 is equipped with a plurality of second switching elements 20, a plurality of resistors 30, and a plurality of voltage sensors 40. The inverter 80 converts the DC electric power into the AC electric power through the turning on/off of the plurality of the first switching elements 10.

One of the first switching elements 10, one of the diodes 60, one of the second switching elements 20, one of the resistors 30, and one of the voltage sensors 40 in the inverter 80 will be described hereinafter (see FIG. 2). The other first switching elements 10, the other diodes 60, the other second switching elements 20, the other resistors 30, and the other voltage sensors 40 are the same as will be described hereinafter, so detailed description thereof will be omitted.

The first switching element 10 in the inverter 80 is, for example, an insulated gate bipolar transistor (an IGBT) or a metal oxide semiconductor field-effect transistor (a MOSFET). The first switching element 10 is connected to the DC electric power supply 100. A plurality of cells (not shown) is formed in the first switching element 10. For example, a plurality of IGBT cells or a plurality of MOSFET cells are formed in the first switching element 10.

Figure 2:
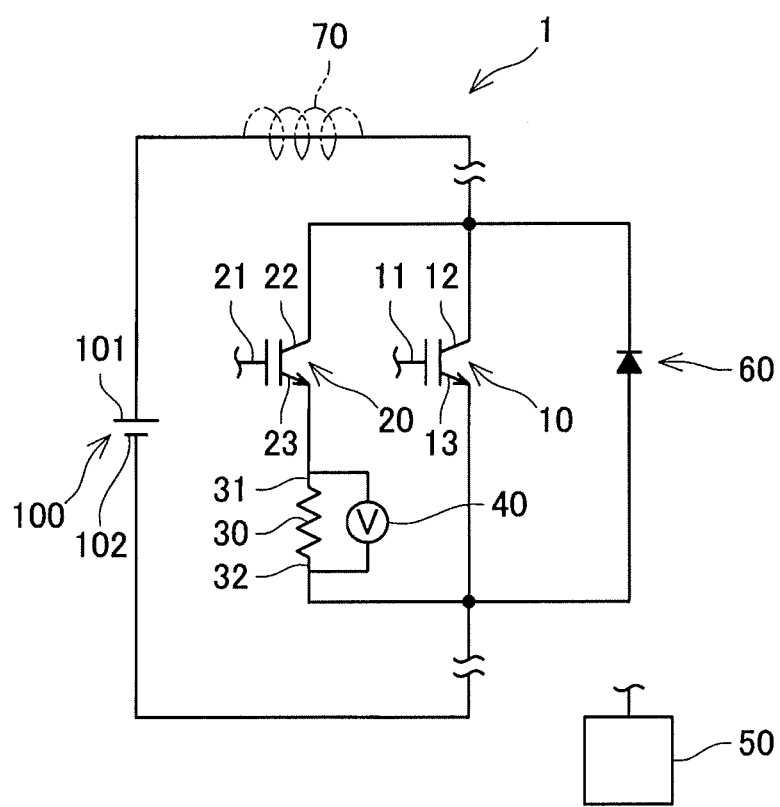
FIG. 2 is a view schematically showing part of the switching circuit according to the embodiment.

As shown in FIG. 2, the first switching element 10 is equipped with a first gate 11, a first collector 12, and a first emitter 13. When the potential of the first gate 11 becomes equal to a potential (hereinafter will be referred to as an "on-potential") at which the switching element is turned on, the first switching element 10 is turned on. When the potential of the first gate 11 becomes equal to a potential (hereinafter will be referred to as an "off-potential") at which the switching element is turned off, the first switching element 10 is turned off. The off-potential of the first gate 11 is a potential at which no channel is formed between the first collector 12 and the first emitter 13 of the first switching element 10 and no current flows therethrough.

The first collector 12 is connected to the positive electrode 101 side of the DC electric power supply 100. The first emitter 13 is connected to the negative electrode 102 side of the DC electric power supply 100. When the potential of the first gate 11 becomes equal to the on-potential, a current flows from the first collector 12 to the first emitter 13 (electrons move from the first emitter 13 to the first collector 12).

The diode 60 is a freewheeling diode. The diode 60 is connected to the DC electric power supply 100 in parallel with the first switching element 10 but the direction in which the current flows in the diode 60 is opposite to that between the first collector 12 and the first emitter 13.

The second switching element 20 is, for example, an IGBT or a MOSFET. The second switching element 20 is connected to the DC electric power supply 100 in parallel with the first switching element 10. A plurality of cells (not shown) is formed in the second switching element 20. For example, a plurality of IGBT cells or a plurality of MSFET cells are formed in the second switching element 20.

The second switching element 20 is equipped with a second gate 21, a second collector 22, and a second emitter 23. When the potential of the second gate 21 becomes equal to an on-potential, the second switching element 20 is turned on. When the potential of the second gate 21 becomes equal to an off-potential, the second switching element 20 is turned off. The off-potential of the second gate 21 is a potential at which no channel is formed between the second collector 22 and the second emitter 23 of the second switching element 20 and no current flows therethrough.

The second collector 22 is connected to the positive electrode 101 side of the DC electric power supply 100. The second collector 22 shares an electrode (not shown) with the first collector 12 of the first switching element 10. The second emitter 23 is connected to the negative electrode 102 side of the DC electric power supply 100. When the potential of the second gate 21 becomes equal to the on-potential, a current flows from the second collector 22 to the second emitter 23 (electrons move from the second emitter 23 to the second collector 22).

The number of cells formed in the first switching element 10 is different from the number of cells formed in the second switching element 20. The number of cells in the first switching element 10 is larger than the number of cells in the second switching element 20. For example, the number of cells in the first switching element 10 is 100 times as large as the number of cells in the second switching element 20. Therefore, the current flowing through the first switching element 10 is larger than the current flowing through the second switching element 20. For example, the current flowing through the first switching element 10 is 100 times as large as the current flowing through the second switching element 20.

One end portion 31 of the resistor 30 is connected to the second emitter 23 of the second switching element 20. The other end portion 32 of the resistor 30 is connected to the negative electrode 102 side of the DC electric power supply 100. The resistor 30 is connected to the DC electric power supply 100 in series with the second switching element 20.

The voltage sensor 40 detects a voltage applied to the resistor 30. The voltage sensor 40 is connected to one end portion 31 and the other end portion 32 of the resistor 30. The voltage sensor 40 is connected to the second switching element 20 in parallel with the resistor 30.

As shown in FIG. 1, a parasitic inductance 70 is formed in the switching circuit 1. The parasitic inductance 70 is virtually shown in FIG. 1. The parasitic inductance 70 is not an intrinsic element in the switching circuit 1, but is inevitably formed as a result of the other elements included in the switching circuit 1. For example, the parasitic inductance 70 is formed as a result of the smoothing capacitor 90, a bus bar (not shown), a conducting wire (not shown), and the like in the switching circuit 1. Besides, a closed circuit 71 that does not include the DC electric power supply 100 is formed in the switching circuit 1. The closed circuit 71 includes at least the first switching element 10, the second switching element 20, the resistor 30, and the parasitic inductance 70.

Next, the operation of the above-mentioned switching circuit 1 will be described. In the above-mentioned switching circuit 1, the control device 50 turns on/off the plurality of the first switching elements 10 in the inverter 80. Then, a DC electric power output from the DC electric power supply 100 is converted into an AC electric power by the inverter 80, and this AC electric power is supplied to the motor 200. The following description will be given focusing on one of the first switching elements 10, one of the second switching elements 20, one of the resistors 30, and one of the voltage sensors 40 in the inverter 80. The contents that will be described hereinafter hold true for the other first switching elements 10, the other second switching elements 20, the other resistors 30, and the other voltage sensors 40 as well.

In the above-mentioned switching circuit 1, the control device 50 first changes over the potential of the first gate 11 of the first switching element 10 from the off-potential to the on-potential. Thus, the first switching element 10 is turned on. When the first switching element 10 is turned on, a current flows to the first switching element 10 through the first collector 12 and the first emitter 13.

Besides, in the above-mentioned switching circuit 1, the control device 50 changes over the potential of the second gate 21 of the second switching element 20 from the off-potential to the on-potential. The control device 50 makes the potential of the first gate 11 and the potential of the second gate 21 equal to the same on-potential. Besides, the control device 50 changes over the potential of the first gate 11 and the potential of the second gate 21 to the on-potential at the same timing. Accordingly, the first switching element 10 and the second switching element 20 are turned on at the same timing. When the second switching element 20 is turned on, a current flows to the second switching element 20 through the second collector 22 and the second emitter 23.

Besides, when the second switching element 20 is turned on, a voltage is applied to the resistor 30, which is connected in series to the second switching element 20, and a current flows through the resistor 30. The voltage applied to the resistor 30 is detected by the voltage sensor 40. The voltage sensor 40 detects the voltage between one end portion 31 and the other end portion 32 of the resistor 30. The voltage detected by the voltage sensor 40 is transmitted from the voltage sensor 40 to the control device 50.

The control device 50 computes a current flowing through the resistor 30, based on the voltage detected by the voltage sensor 40. Besides, the control device 50 computes a current flowing through the second switching element 20, based on the current flowing through the resistor 30. Besides, the control device 50 computes a current flowing through the first switching element 10, based on the current flowing through the second switching element 20. The control device 50 computes the respective values based on equations (1), (2), and (3) shown below. In the equation (1) shown below, I30 denotes the current flowing through the resistor 30. Besides, V30 denotes the voltage applied to the resistor 30. Besides, R30 denotes a resistance of the resistor 30. This resistance R30 is a known value that is determined by, for example, a design condition or the like. Besides, in the equation (2) shown below, I20 denotes the current flowing through the second switching element 20. Besides, in the equation (3) shown below, I10 denotes the current flowing through the first switching element 10. The equation (3) shown below is a calculation formula in the case where the current flowing through the first switching element 10 is 100 times as large as the current flowing through the second switching element 20.

$$I30 = \frac{V30}{R30} \tag{1}$$

$$I20 = I30 \tag{2}$$

$$I10 = 100 \times I20 \tag{3}$$

Figure 3:
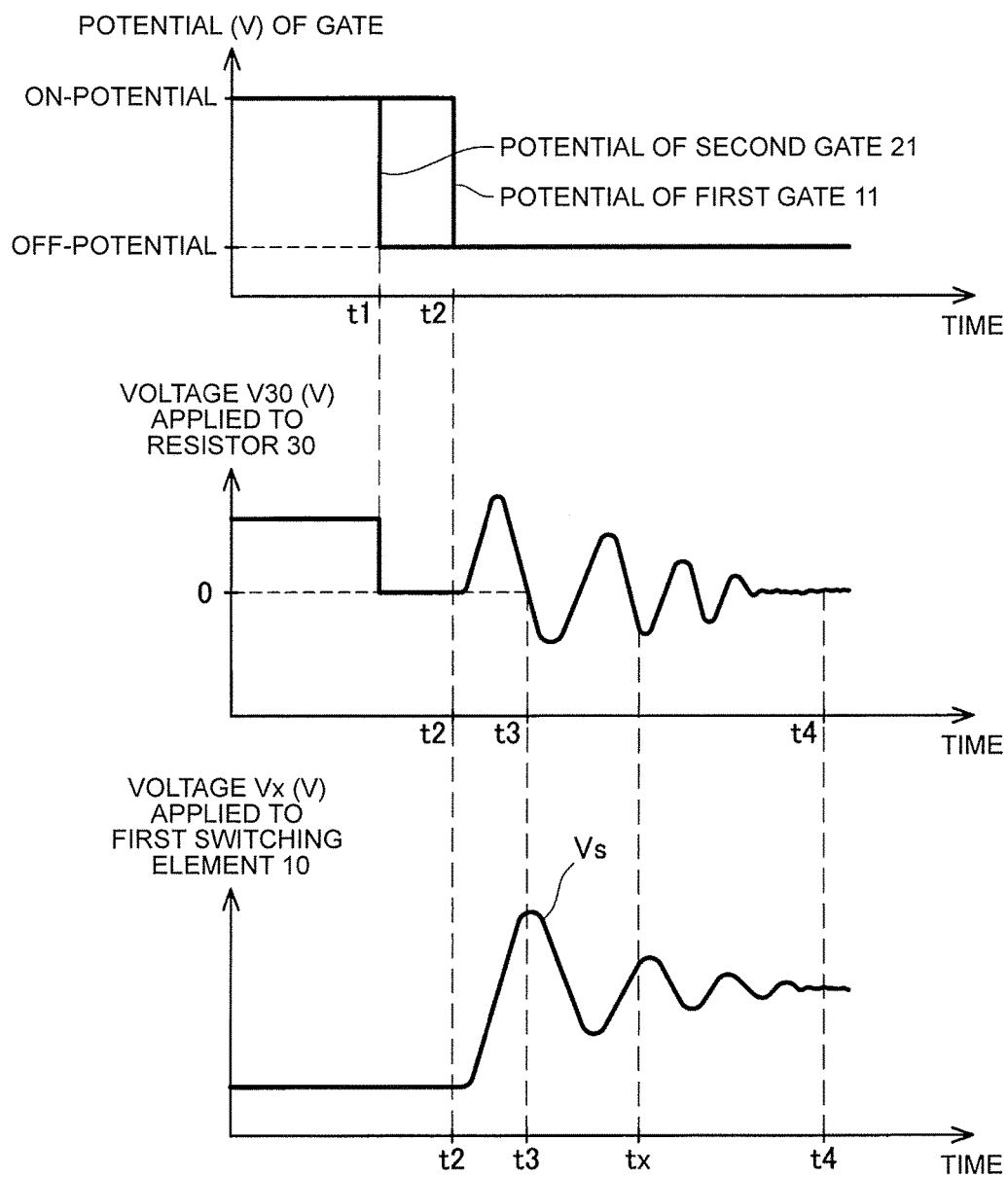
FIG. 3 is a view schematically showing the contents of control that is performed by a control device according to the embodiment.

Subsequently, the timings when the first switching element 10 and the second switching element 20 are turned off will be described with reference to FIG. 3. As shown in FIG. 3, the control device 50 of the switching circuit 1 first changes over the potential of the second gate 21 to the off-potential at a timing t1, from a state where the potential of the first gate 11 and the potential of the second gate 21 are made equal to the same on-potential. More specifically, the control device 50 changes over the potential of the second gate 21 to the same potential as that of the second emitter 23. Thus, the potential of the second gate 21 becomes equal to the off-potential. When the potential of the second gate 21 becomes equal to the off-potential, the second switching element 20 is turned off. Accordingly, no current flows through the second switching element 20.

Figure 4:
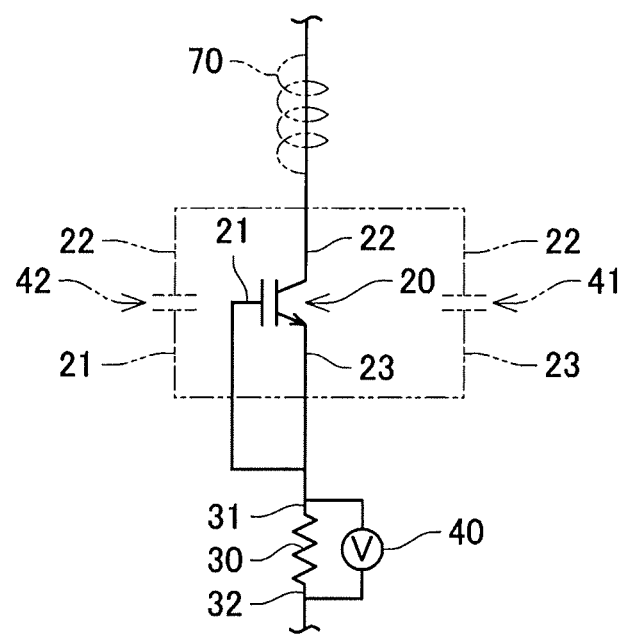
FIG. 4 is a view schematically showing part of the switching circuit according to the embodiment.

Besides, as shown in FIG. 4, a first parasitic capacitor 41 is formed in the second switching element 20, between the second collector 22 and the second emitter 23 of the second switching element 20. The first parasitic capacitor 41 is virtually shown in FIG. 4. The first parasitic capacitor 41 is not an intrinsic functional element in the switching circuit 1, but is inevitably formed in the second switching element 20.

By the same token, a second parasitic capacitor 42 is formed in the second switching element 20, between the second collector 22 and the second gate 21 of the second switching element 20. The second parasitic capacitor 42 is virtually shown in FIG. 4. The second parasitic capacitor 42 is not an intrinsic functional element in the switching circuit 1, but is inevitably formed in the second switching element 20.

The first parasitic capacitor 41 and the second parasitic capacitor 42 are formed in parallel with each other in the second switching element 20. Besides, the second switching element 20 is provided in parallel with the first switching element 10. Therefore, the first parasitic capacitor 41 and the second parasitic capacitor 42 are provided in parallel with the first switching element 10. As a result, the voltage applied to the first parasitic capacitor 41 and the second parasitic capacitor 42 is substantially the same as the voltage applied to the first switching element 10. Incidentally, the voltage applied to the first switching element 10 and the voltage applied to the second switching element 20 are different from each other by the voltage applied to the resistor 30, which is connected in series to the first parasitic capacitor 41 and the second parasitic capacitor 42. However, since the voltages are much lower than the voltage of the DC electric power supply 100, this difference is negligible.

An electric charge is accumulated in each of the first parasitic capacitor 41 and the second parasitic capacitor 42 through the application of the voltage thereto. Each electric charge is computed based on equations (4), (5), and (6) shown below. In the equation (4) shown below, Q41 denotes the electric charge accumulated in the first parasitic capacitor 41. Besides, C41 denotes an electrostatic capacitance of the first parasitic capacitor 41. This electrostatic capacitance C41 is a known value that is determined by, for example, a design condition or the like. Besides, Vx denotes the voltage applied to the first parasitic capacitor 41 and the second parasitic capacitor 42 (i.e., the voltage applied to the first switching element 10). Besides, in the equation (5) shown below, Q42 denotes an electric charge accumulated in the second parasitic capacitor 42. Besides, C42 denotes an electrostatic capacitance of the second parasitic capacitor 42. This electrostatic capacitance C42 is a known value that is determined by, for example, a design condition or the like. Besides, in the equation (6) shown below, Qs denotes the sum of the electric charges accumulated in the first parasitic capacitor 41 and the second parasitic capacitor 42.

$$Q41 = C41 \times Vx \quad (4)$$

$$Q42 = C42 \times Vx \quad (5)$$

$$Qs = Q41 + Q42 = (C41 + C42) \times Vx \quad (6)$$

Subsequently, the timing when the first switching element 10 is turned off will be described. As shown in FIG. 3, the control device 50 changes over the potential of the first gate 11 of the first switching element 10 from the on-potential to the off-potential at a timing t2, after turning off the second switching element 20. The timing t2 follows the timing t1. When the potential of the first gate 11 becomes equal to the off-potential, the first switching element 10 is turned off. Accordingly, no current flows through the first switching element 10.

At the timing t2, the first switching element 10 is changed over from its on state to its off state. Thus, a change is made from a state where a current flows through the first switching element 10 to a state where no current flows through the first switching element 10, and the voltage of the DC electric power supply 100 is applied to the first switching element 10. In addition, an electromotive force is generated as a result of the parasitic inductance 70 in the switching circuit 1. The electromotive force is generated as the current flowing through the parasitic inductance 70 changes. As a result, a voltage resulting from the electromotive force is applied between the first collector 12 and the first emitter 13 of the first switching element 10.

When the first switching element 10 is on, a larger current flows through the first switching element 10 than through the second switching element 20. Therefore, when the first switching element 10 changes over from its on state to its off state, a larger electromotive force is generated than in the case where the second switching element 20 changes over from its on state to its off state. As a result, as shown in FIG. 3, when the first switching element 10 changes over from its on state to its off state, a large surge voltage Vs is applied to the first switching element 10.

When the first switching element 10 is turned off and the voltage applied between the first collector 12 and the first emitter 13 of the first switching element 10 changes, the voltage applied to the resistor 30 also changes. The voltage applied to the resistor 30 is detected by the voltage sensor 40. Besides, when the first switching element 10 is turned off, the amount of electric charge accumulated in each of the first parasitic capacitor 41 and the second parasitic capacitor 42 changes, so a current flows through the closed circuit 71 shown in FIG. 1. Therefore, the current flows through the resistor 30 included in the closed circuit 71.

Subsequently, in the above-mentioned switching circuit 1, the control device 50 time-integrates a value proportional to the voltage detected by the voltage sensor 40, after turning off the first switching element 10. The control device 50 time-integrates the value proportional to the voltage detected by the voltage sensor 40 from the timing t2 when the first switching element 10 is turned off to a predetermined timing tx. Thus, the control device 50 computes a voltage applied to the first switching element 10 at the predetermined timing tx, after turning off the first switching element 10. More specifically, the control device 50 computes the voltage applied to the first switching element 10 at the predetermined timing tx, based on equations (7), (8), (9), and (10) shown below. In the equation (7), dQs/dt denotes a time derivative of the sum Qs of the electric charges accumulated in the first parasitic capacitor 41 and the second parasitic capacitor 42, namely, a current flowing from the first parasitic capacitor 41 and the second parasitic capacitor 42. That is, dQs/dt is equal to the current I30 flowing through the resistor 30, which is connected in series to the first parasitic capacitor 41 and the second parasitic capacitor 42. In the equations (7), (8), (9), and (10) shown below, V30, R30, C41, C42, and Vx have been described above, so detailed description thereof will be omitted.

$$\frac{dQs}{dt} = (C41 + C42) \times \frac{dVx}{dt} = I30 \quad (7)$$

$$V30 = I30 \times R30 = (C41 + C42) \times \frac{dVx}{dt} \times R30 \quad (8)$$

$$\frac{dVx}{dt} = \frac{V30}{(C41 + C42) \times R30} \quad (9)$$

$$Vx = \int_{t2}^{tx} \frac{dVx}{dt} dt = \int \frac{V30}{(C41 + C42) \times R30} dt \quad (10)$$

Due to the foregoing, a voltage Vx applied between the first collector 12 and the first emitter 13 of the first switching element 10 at the predetermined timing tx is calculated. After that, the control device 50 turns on the first switching element 10 and the second switching element 20 again.

The control device 50 can also compute a maximum value of the voltage Vx applied to the first switching element 10, based on the above-mentioned equations (7), (8), (9), and (10). For example, in the case where the voltage Vx applied to the first switching element 10 is maximized at a timing t3, the control device 50 time-integrates a value proportional to the voltage detected by the voltage sensor 40 from the timing t2 to the timing t3, in the above-mentioned equation (10). Thus, a maximum value of the voltage Vx applied to the first switching element 10 is calculated.

The timing t3 corresponding to the maximum value of the voltage Vx applied to the first switching element 10 is calculated based on, for example, a timing when the voltage applied to the resistor 30 first changes from a positive value to a negative value. Besides, the control device 50 may specify the maximum value of the voltage Vx applied to the first switching element 10, by monitoring the value time-integrated based on the above-mentioned equation (10).

The switching circuit 1 according to the embodiment has been described above. As is apparent from the foregoing description, the switching circuit 1 is equipped with the DC electric power supply 100, the first switching element 10 that is connected to the DC electric power supply 100, and the second switching element 20 that is connected to the DC electric power supply 100 in parallel with the first switching element 10. Besides, the switching circuit 1 is equipped with the resistor 30 that is connected to the DC electric power supply 100 in series with the second switching element 20, the voltage sensor 40 that detects the voltage applied to the resistor 30, and the control device 50. The second switching element 20 and the resistor 30 are provided to measure the current flowing through the first switching element 10. The first switching element 10 is equipped with the first gate 11, the first collector 12 that is connected to the positive electrode 101 side of the DC electric power supply 100, and the first emitter 13 that is connected to the negative electrode 102 side of the DC electric power supply 100. The second switching element 20 is equipped with the second gate 21, the second collector 22 that is connected to the positive electrode 101 side of the DC electric power supply 100, and the second emitter 23 that is connected to the negative electrode 102 side of the DC electric power supply 100. In the above-mentioned switching circuit 1, the control device 50 turns off the second switching element 20 by making the potential of the second gate 21 equal to the off-potential, from the state where the current flowing through the first switching element 10 is larger than the current flowing through the second switching element 20 and the potential of the first gate 11 of the first switching element 10 and the potential of the second gate 21 of the second switching element 20 are made equal to the same on-potential. After that, the control device 50 turns off the first switching element 10 by making the potential of the first gate 11 equal to the off-potential. The control device 50 computes the voltage applied between the first collector 12 and the first emitter 13 after turning off the first switching element 10, by time-integrating the value proportional to the voltage detected by the voltage sensor 40 after turning off the first switching element 10 (see the equation (10)).

According to the above-mentioned switching circuit 1, the voltage Vx applied between the first collector 12 and the first emitter 13 of the first switching element 10 can be measured, through the use of the second switching element 20 and the resistor 30. That is, according to the above-mentioned switching circuit 1, when the control device 50 turns off the second switching element 20, the second switching element 20 operates as a synthetic capacitor of the first parasitic capacitor 41 and the second parasitic capacitor 42. The electric charge Qs accumulated in the first parasitic capacitor 41 and the second parasitic capacitor 42 assumes a value proportional to the voltage Vx applied to the first switching element 10 (see the equation (6)). As a result, the current flowing from the first parasitic capacitor 41 and the second parasitic capacitor 42 assumes a value proportional to the time derivative of the voltage Vx applied to the first switching element 10 (see the equation (7)). Therefore, after the control device 50 turns off the second switching element 20, the current 130 flowing through the resistor 30 assumes a value proportional to the time derivative of the voltage Vx applied to the first switching element 10 (see the equation (7)). Thus, the control device 50 can compute the voltage Vx applied to the first switching element 10 by time-integrating the value proportional to the voltage V30 applied to the resistor 30 (the voltage detected by the voltage sensor 40), after turning off the first switching element 10 (see the equations (8) to (10)). According to this configuration, the voltage Vx applied to the first switching element 10 can be measured through the use of the existing second switching element 20 and the existing resistor 30, even though there is no additional component (e.g., a capacitor). Therefore, the surge voltage Vs applied to the first switching element 10 can be measured with a simple configuration. The measured voltage Vx (or Vs) is utilized in, for example, the control device 50. For example, the voltage Vx (or Vs) measured above is utilized to adjust the timings when the control device 50 turns on/off the plurality of the first switching elements 10.

Besides, in the above-mentioned switching circuit 1, the control device 50 computes the current flowing through the first switching element 10, based on the voltage detected by the voltage sensor 40, before turning off the second switching element 20 (see the above-mentioned equations (1) to (3)). Therefore, before the control device 50 turns off the second switching element 20, the current 10 flowing through the first switching element 10 can be measured through the use of the existing second switching element 20 and the existing resistor 30. Besides, after the control device 50 turns off the first switching element 10, the voltage Vx applied to the first switching element 10 can be measured through the use of the existing second switching element 20 and the existing resistor 30. Therefore, the configuration for measuring the current is appropriable as the configuration for measuring the voltage, and the voltage applied to the first switching element 10 can be measured even though there is no additional component.

Besides, in the above-mentioned switching circuit 1, the control device 50 computes the maximum value of the voltage Vx applied between the first collector 12 and the first emitter 13, after turning off the first switching element 10. Therefore, the voltage Vx at the time when a maximum load is applied to the first switching element 10 (when a maximum withstanding voltage is required of the first switching element 10) can be measured.

Although the single embodiment has been described above, the concrete aspect is not limited to the aforementioned embodiment. In the following description, the same components as in the foregoing description are denoted by the same reference symbols respectively, and the description thereof will be omitted.

In another additional embodiment, the control device 50 may correct, based on a correction coefficient, the computed voltage Vx applied to the first switching element 10. In this case, as shown in FIG. 3, the control device 50 time-integrates the value proportional to the voltage detected by the voltage sensor 40, until a predetermined timing t4 when the voltage detected by the voltage sensor 40 stabilizes. Thus, the voltage Vx applied to the first switching element 10 at the predetermined timing t4 is calculated.

Subsequently, the control device 50 computes the correction coefficient based on the computed voltage Vx (the voltage Vx applied to the first switching element 10 at the predetermined timing t4) and the voltage of the DC electric power supply 100. More specifically, the control device 50 computes the correction coefficient based on an equation (11) shown below. In the equation (11) shown below, A denotes the correction coefficient. Besides, V100 denotes the voltage of the DC electric power supply 100. Besides, Vxt4 denotes the voltage Vx applied to the first switching element 10 at the predetermined timing t4.

$$A = \frac{V100}{Vxt4} \qquad (11)$$

Subsequently, the control device 50 corrects the computed voltage Vx (the voltage Vx applied to the first switching element 10 at the predetermined timing tx), based on the computed correction coefficient A. More specifically, the control device 50 corrects the computed voltage Vx based on an equation (12) shown below. In the equation (12) shown below, Vx denotes the voltage applied to the first switching element 10 at the predetermined timing tx. Besides, Vxc denotes a corrected value of the voltage Vx applied to the first switching element 10. The control device 50 can correct the maximum value of the voltage Vx applied to the first switching element 10, based on, for example, the equation (12) shown below.

$$Vxc = A \times Vx \qquad (12)$$

As described above, in the additional embodiment, the control device 50 computes the voltage Vxt4 applied between the first collector 12 and the first emitter 13 of the first switching element 10 at the predetermined timing t4, by time-integrating the value proportional to the voltage detected by the voltage sensor 40 until the predetermined timing t4, and computes the correction coefficient A based on the computed voltage Vxt4 and the voltage V100 of the DC electric power supply 100 (see the equation (11)). Besides, the control device 50 corrects the maximum value of the voltage Vx based on the correction coefficient A (see the equation (12)).

When the switching circuit 1 is used many times, the characteristics of the respective elements of the switching circuit 1 may change through aging. As a result, the voltage detected by the voltage sensor 40 may varify. According to the above-mentioned configuration, the dispersion of the maximum value of the computed voltage Vx can be corrected by the correction coefficient A (in the additional embodiment).

In the above-mentioned embodiment, the control device 50 time-integrates the value proportional to the voltage detected by the voltage sensor 40, from the timing t2 when the first switching element 10 is turned off to the predetermined timing. In still another additional embodiment, the control device 50 may time-integrate the value proportional to the voltage detected by the voltage sensor 40 from the timing t1 when the second switching element 20 is turned off to the predetermined timing. The voltage applied to the resistor 30 from the timing t1 to the timing t2 (the voltage detected by the voltage sensor 40) is approximately equal to 0 V. Therefore, the value calculated in the case where the control device 50 carries out time integration from the timing t1 and the value calculated in the case where the control device 50 carries out time integration from the timing t2 are approximately equal to each other.

Besides, the method of integration at the time when the control device 50 carries out integration is not limited in particular. For example, the control device 50 may subject the voltage detected by the voltage sensor 40 to AD conversion at high speed, and cumulate values obtained through conversion. Besides, for example, the voltage applied to the resistor 30 may be converted into a current by a separate conversion circuit. Then, a separate capacitor may be charged with the current obtained through conversion. The control device 50 may carry out integration based on the electric charge accumulated in the separate capacitor.

In the above-mentioned embodiment, each of the first switching element 10 and the second switching element 20 has been described as being configured to be equipped with the collector and the emitter. However, the same holds true if a drain and a source are substituted for the collector and the emitter.

In the aforementioned embodiment, the resistor 30 is connected to the second emitter 23 of the second switching element 20, but the disclosure is not limited to this configuration. The resistor 30 may be connected to the second collector 22 of the second switching element 20. In this case, one end portion 31 of the resistor 30 is connected to the positive electrode 101 side of the DC electric power supply 100, and the other end portion 32 of the resistor 30 is connected to the second collector 22 of the second switching element 20.

In the aforementioned embodiment, the control device 50 makes the potential of the second gate 21 of the second switching element 20 equal to the potential of the second emitter 23 of the second switching element 20 when turning off the second switching element 20. However, the control device 50 is not necessarily required to make the potential of the second gate 21 of the second switching element 20 equal to the potential of the second emitter 23 of the second switching element 20. The control device 50 may turn off the second switching element 20 with the potential of the second gate 21 of the second switching element 20 being different from the potential of the second emitter 23 of the second switching element 20.

The technical elements disclosed by the present specification will be mentioned hereinafter. Incidentally, the following respective technical elements are useful independently of one another.

The control device may compute the current flowing through the first switching element, based on the voltage detected by the voltage sensor before turning off the second switching element.

According to this configuration, the current flowing through the first switching element can be measured through the use of the existing second switching element and the existing resistor, before the control device turns off the second switching element. Besides, the voltage applied between the first collector and the first emitter of the first switching element can be measured, through the use of the existing second switching element and the existing resistor, after the control device turns off the first switching element. Therefore, the configuration for measuring the current is appropriable as the configuration for measuring the voltage, and the voltage applied between the first collector and the first emitter of the first switching element can be measured even though there is no additional component.

The control device may compute the maximum value of the voltage applied between the first collector and the first emitter, after turning off the first switching element.

According to this configuration, the voltage at the time when a maximum load is applied to the first switching element (when a maximum withstanding voltage is required of the first switching element) can be measured.

The control device may compute the voltage applied between the first collector and the first emitter of the first switching element at the predetermined timing, by integrating the value proportional to the voltage detected by the voltage sensor to the predetermined timing, compute the correction coefficient based on the computed voltage and the voltage of the DC electric power supply, and correct the maximum value based on the correction coefficient.

When the switching circuit is used many times, the characteristics of the respective elements of the switching circuit may change through aging. As a result, the voltage detected by the voltage sensor may disperse. According to the above-mentioned configuration, the dispersion of the maximum value of the computed voltage can be corrected using the correction coefficient.

Although the concrete examples of the disclosure have been described above in detail, they exemplifications and do not limit the present disclosure. The art set forth in the present disclosure encompasses various modifications and alterations of the concrete examples exemplified above. The technical elements described in the present specification or the drawings are technically useful alone or in various combinations. Besides, the art exemplified in the present specification or the drawings can achieve a plurality of objects at the same time, and is technically useful by achieving one of the objects alone.

What is claimed is:

1. A switching circuit comprising:
   a DC electric power supply;
   a first switching element that is connected to the DC electric power supply, the first switching element including a first gate, a first collector that is connected to a positive electrode side of the DC electric power supply, and a first emitter that is connected to a negative electrode side of the DC electric power supply;
   a second switching element that is connected to the DC electric power supply in parallel with the first switching element, the second switching element including a second gate, a second collector that is connected to the positive electrode side of the DC electric power supply, and a second emitter that is connected to the negative electrode side of the DC electric power supply;
   a resistor that is connected to the DC electric power supply in series with the second switching element;
   a voltage sensor that detects a voltage applied to the resistor; and
   a control device, wherein:
   a current flowing through the first switching element is larger than a current flowing through the second switching element; and
   the control device is configured to:
      from a state where a potential of the first gate of the first switching element and a potential of the second gate of the second switching element are the same and are equal to an on-potential, turn off the second switching element by setting the potential of the second gate of the second switching element equal to an off-potential and then turn off the first switching element by setting the potential of the first gate equal to an off-potential; and
      after turning off the first switching element, compute a voltage applied between the first collector and the first emitter by integrating a value proportional to a voltage that is detected by the voltage sensor after turning off the first switching element.

2. The switching circuit according to claim 1, wherein the control device is configured to, based on a voltage that is detected by the voltage sensor before turning off the second switching element, compute a current flowing through the first switching element.

3. The switching circuit according to claim 1, wherein the control device is configured to compute a maximum value of a voltage applied between the first collector and the first emitter after turning off the first switching element.

4. The switching circuit according to claim 3, wherein the control device is configured to:
   compute a voltage applied between the first collector and the first emitter of the first switching element at a predetermined timing, by integrating a value proportional to the voltage detected by the voltage sensor until the predetermined timing;
   compute a correction coefficient based on the computed voltage and a voltage of the DC electric power supply; and
   correct the maximum value based on the correction coefficient.

* * * * *